United States Patent [19]

Chippendale, Jr.

[11] Patent Number: 4,660,107

[45] Date of Patent: Apr. 21, 1987

[54] METHOD AND APPARATUS FOR CUEING AND PACING IN AUDIO AND AUDIO-VISUAL WORK

[76] Inventor: Arthur Chippendale, Jr., 1636 N. Verdugo Rd., Glendale, Calif. 91208

[21] Appl. No.: 587,616

[22] Filed: Mar. 8, 1984

[51] Int. Cl.⁴ .................. G11B 27/02; H04N 5/24; G08B 1/00

[52] U.S. Cl. .................. 360/14.3; 358/185; 340/309.15; 340/309.4; 368/41

[58] Field of Search .................. 360/13, 14.1, 14.2, 360/14.3, 72.2, 74.4; 358/185; 352/38, 56, 129; 200/DIG. 34; D14/5, 10; 340/309.15, 309.4; 368/41, 42, 43, 10, 82

[56] References Cited

U.S. PATENT DOCUMENTS

| | | | |
|---|---|---|---|
| 3,982,387 | 9/1976 | Tanaka | 368/82 |
| 4,074,251 | 2/1978 | Creely | 340/309.4 |
| 4,302,752 | 11/1981 | Weitzler | 340/309.4 X |
| 4,490,711 | 12/1984 | Johnston | 368/43 X |

FOREIGN PATENT DOCUMENTS 2047432 11/1980 United Kingdom ............... 360/14.2

OTHER PUBLICATIONS

"AE-6000, A New Automatic Computerized Editing System", RCA Broadcast News USA, No. 164, Jun. 1978 pp. 19-22.

"Design Criteria of Video Post Production Systems with Optimum Operational Editing Convenience", Habeumann et al., SMPTE Journal, vol. 88, No. 7, Jul. 73, pp. 486-490.

"Video Assited Film Editing System", Kay, SMPTE Journal, Jun. 82, pp. 547-551.

*Primary Examiner*—Aristotelis M. Psitos
*Attorney, Agent, or Firm*—James E. Brunton

[57] ABSTRACT

An electronic cueing and pacing apparatus designed specially for film and audio-visual work. The apparatus comprises a time-code generator/transmitter and a receiver/decoder for recording and reading a digital time-code on multi-track audio or video tapes. It incorporates a four digit numerical display indicating running time in minutes and seconds, and a linear display containing a row of sixty cueing and pacing lights. The lights illuminate consecutively from top to bottom at one second intervals with a recycling time of exactly one minute. Data display forms are disposed adjacent the row of lights for interrelating the audio and visual elements of the performance to be cued or paced in proper juxtaposition to time.

3 Claims, 6 Drawing Figures

SCRIPT TEXT — 42

FOOTAGE AND FRAME NUMBERS

SCENE CAPTIONS

| TITLE: | AUDIO | 1 | 2 | 3 | 4 | TRACK | VISUALS | SHEET(2) | INDEX |
|---|---|---|---|---|---|---|---|---|---|
| | | | | | | | ORCHESTRA ON STAGE | | 36-32 |
| IT BRINGS OUTSTANDING CONCERT | | | | | | | | | |
| ARTISTS TO LOS ANGELES FOR THE | | | | | | | | | |
| ENJOYMENT OF ALL. | | | | | | | | | |
| | | | | | | | YOUTH SYMPHONY | | 41-27 |
| THE PHILHARMONIC ALSO PRESENTS | | | | | | | | | |
| SYMPHONIES FOR YOUTH, AND A | | | | | | | | | |
| SPECIAL PROGRAM WHICH INTRODUCES | | | | | | | | | |
| THOUSANDS OF CHILDREN TO THE MUSIC | | | | | | | | | |
| CENTER AND CLASSICAL MUSIC. | | | | | | | | | |
| | | | | | | | BOY WITH TRUMPET | | 48-08 |
| AND A PROGAM IN ORCHESTRAL | | | | | | | | | |
| TRAINING FOR MINORITY STUDENTS IN | | | | | | | | | |
| WHICH PHILHARMONIC MUSICIANS SHARE | | | | | | | | | |
| THEIR EXPERTISE WITH THE YOUNG | | | | | | | | | |
| PEOPLE WHO WILL BECOME THE | | | | | | | | | |
| PROFESSIONALS OF TOMORROW. | | | | | | | | | |
| | | | | | | | OPERA SCENE | | 56-21 |
| THE NEW YORK CITY OPERA COMES TO | | | | | | | | | |
| THE PAVILION EVERY YEAR THROUGH | | | | | | | | | |
| THE MUSIC CENTER OPERA | | | | | | | | | |
| ASSOCIATION. | | | | | | | | | |
| | | | | | | | BEVERLY SILLS | | 62-34 |
| BEVERLY SILLS, WHO SANG DOZENS OF | | | | | | | | | |
| ROLLS HERE, IS NOW DIRECTOR OF | | | | | | | | | |
| THIS FAMOUS COMPANY. | | | | | | | | | |
| | | | | | | | BALLET AT PAVILION | | 67-19 |
| ALSO FROM NEW YORK, THE AMERICAN | | | | | | | | | |
| BALLET THEATER COMES TO THE | | | | | | | | | |
| PAVILION EVERY FALL AS PART OF | | | | | | | | | |
| ITS REGULAR SEASON. | | | | | | | | | |

( ) MIXING LEVEL

METHOD AND APPARATUS FOR CUEING AND PACING IN AUDIO AND AUDIO-VISUAL WORK

BACKGROUND OF THE INVENTION

1. Field of the Invention

The present invention relates generally to cueing methods and devices for use in audio and audio-visual work. More particularly the invention concerns a unique electronic cueing and pacing apparatus including a digital display correlated with a linear display comprising a plurality of sequentially illuminated lights and specially designed data display forms for interrelating audio and visual elements in proper juxtaposition to time.

2. Discussion of the Prior Art

There exists today in the prior art time-code generator/transmitters and receiver/decoders, script formats, narration and sound effects cue sheets, and running time indicators. However, none of the prior art devices effectively bring together and correlate all of these elements as does the novel system of the present invention. Similarly, various types of electro-mechanical reading pacers, such as used for reading speed and comprehension improvement have been developed.

As will be discussed in greater detail in the paragraphs which follow, the apparatus of the present invention has numerous advantages over prior art devices. For example, it will operate continuously and silently without generating acoustic or electro-magnetic noise which can be picked up by a recording microphone placed in the proximity of the apparatus. Additionally, the apparatus operates at a constant clocked speed, is readily adaptable for many types of programming applications, is simple to use and permits substantial savings in time and money over prior art systems.

SUMMARY OF THE INVENTION

The design of the novel apparatus of the present invention is based on the premise that time is the controlling factor in all audio and audio-visual synchronization and that synchronization, sound mixing and audio-visual programming can best be accomplished by interrelating the audio and visual elements in proper juxtaposition to time. Accordingly, at the heart of the system is a time-code means for recording a time code on, and reading from, multitrack audio and video tapes. In the present embodiment of the invention this means is provided in the form of an electronic time-code generator/transmitter and a receiver/decoder.

Operably associated with the time-code means is a four digit numerical display for indicating running time in minutes and seconds, and a linear display containing a row of sixty cueing and pacing lights. The pacing lights are mounted along the margin of the upper surface of a prompter unit and light consecutively from top to bottom at one second intervals with a recycling time of exactly one minute. The four digit numerical display which is also mounted on the prompter unit, operates in synchronism with the linear display and both follow the running time-code when it is in the transmit mode, and tape position when it is in the receive mode.

The upper surface of the prompter unit is designed to support specially designed data display forms such that the left-hand margin of the forms are adjacent to the vertical row of cueing and pacing lights provided along the margin of the unit.

The prompter unit is adapted to be powered by a 115 volt/60 cycle AC line input, and together with the data display forms and operating procedures provides a complete sound-and-picture matching system.

As will be discussed in greater detail hereinafter, the data display forms provide for the annotation and plotting of narration, music, sound effects, and visual elements in their proper juxtaposition to one another, as well as to time. The forms thus serve as integrated cue sheets, graphically correlating all audio and visual elements, with each line on the form representing one second, and each sheet of the form representing exactly one minute.

A time-code recorded on a dual or multi-track tape permits laying individual sound elements onto adjacent tracks, much like laying sound using full-coat sprocketed magnetic film and a film synchronizer (a mechanism with multiple sprocket wheels on a common shaft), as used in sound-film production. However, instead of laying individual sprocketed sound-tracks opposite corresponding scenes in a workprint or picture reel, the individual tracks are laid opposite corresponding times on the time-code track. This can be accomplished with precision, since the time represented by the lines on the data display forms can be directly related to a film's footage and frame count, by means of a conversion table which relates time in minutes and second to film footage and frames, in increments of 24-frames. The footage and frame position of each scene within a film, as measured by the counter on a film synchronizer, can thus be annotated on the exact line within the respective data display forms, together with a brief scene description. The data display forms thus annotated will double as a conventional scene list, as well as graphically reveal the exact location and relative length of each scene. A most useful feature when preparing measured scripts and plotting sound tracks.

Because the time-code is recorded directly onto the tape at precise intervals, it serves the same function as do the film sprocket holes, insofar as timing and cueing are concerned. Otherwise, when laying sound tracks on unsprocketed tape, one must depend on the recorder's index counter for placement. However, most recorder counters are non-linear belt driven devices which are not good for precise or repeatable cueing.

It is a primary object of the present invention to provide an electronic cueing and pacing apparatus and the method of using the same for graphically interrelating the audio and visual elements of a presentation to time.

More particularly it is an object of the invention to provide a method and apparatus of the aforementioned character which will operate continuously and silently and will facilitate the measuring, timing and profiling of visuals; the writing of measured scripts to compliment pre-timed and pre-edited visuals; the cueing and pacing of narration; the programming of film strip, slide and multi-image presentations; and the profiling of music, lyrics and sound effects, stage light cueing and music scoring.

Another object of the invention is to provide a method and apparatus of the character described which enables sound and video editing; the setting of script texts for pre-recorded and pre-edited narration tracks to time; the plotting and laying of sound tracks; sound mixing and the production of composite sound tracks; and the resolving and synchronizing of tape with sprocketed film.

Still another object of the invention is to provide a method and apparatus of the class described in the preceding paragraph with which composite synchronized sound tracks can be produced at lower cost without the need for intermediate sprocketed sound tracks as used in conventional film-sound track production.

These and other objects of the invention will become apparent from the discussion which follows.

DESCRIPTION OF THE INVENTION

Figure 1:
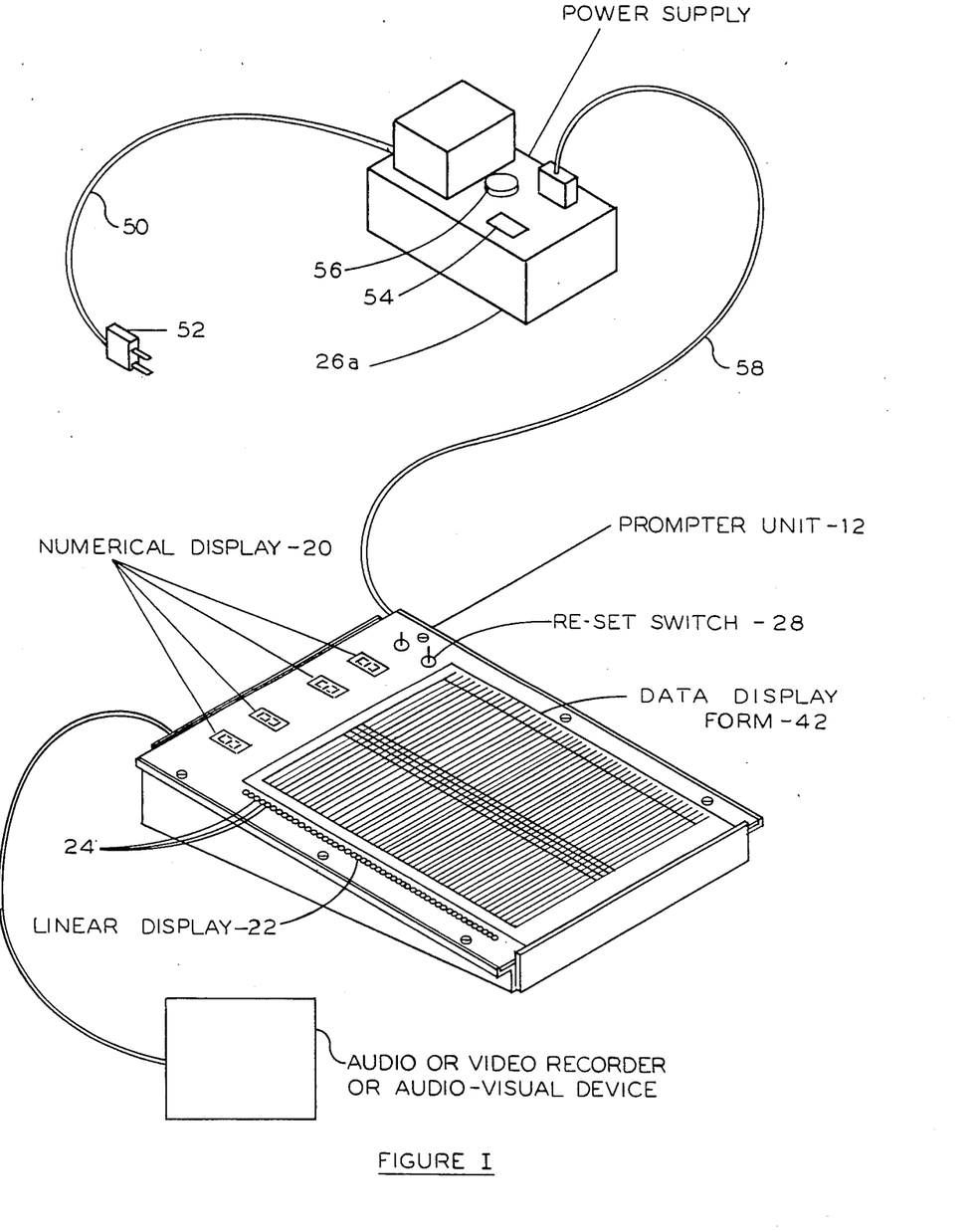
FIG. 1 is a generally perspective view of the apparatus of the invention showing the prompter unit of the invention interconnected with a power supply. A specially designed data display form is shown in position on the upper surface of the prompter unit.
Figure 2:
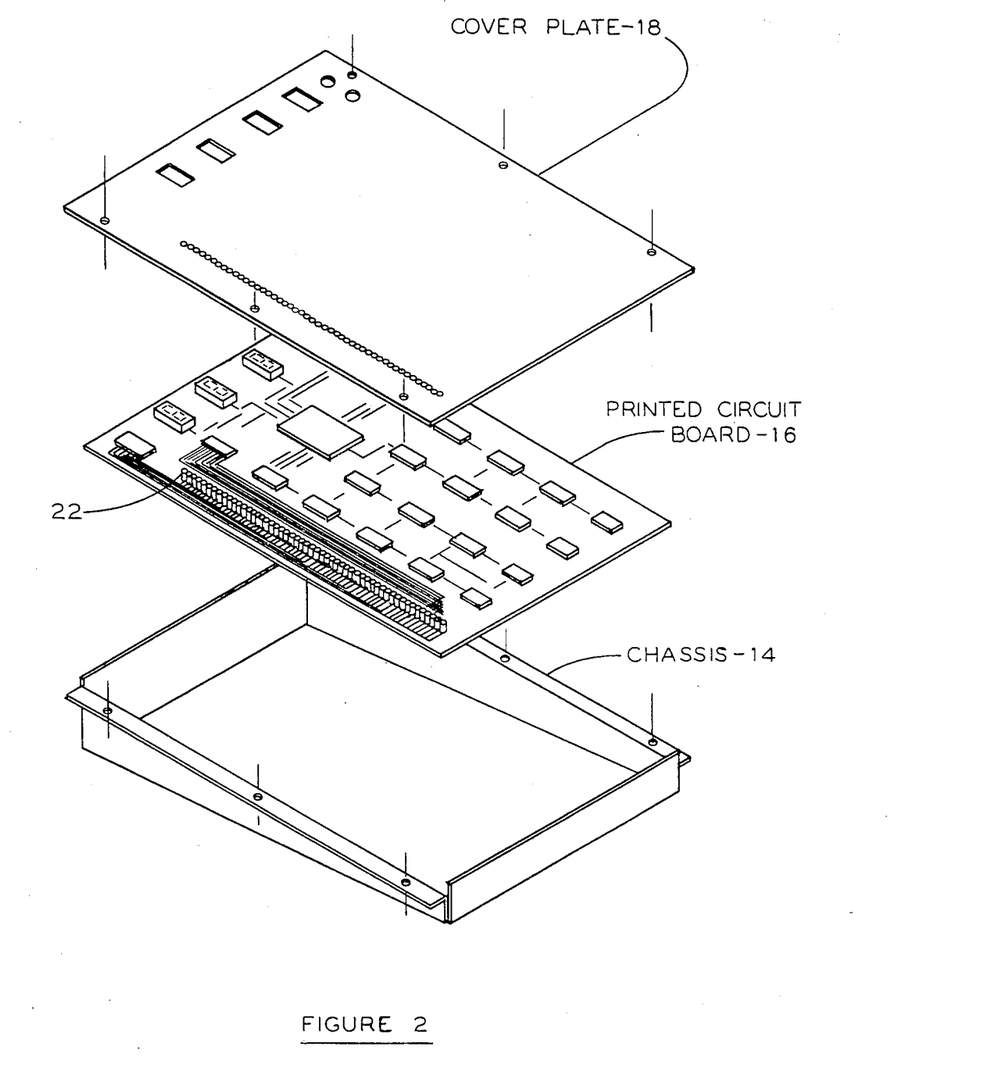
FIG. 2 is an exploded perspective view of the prompter unit of the invention.

Referring to the drawings and particularly to FIGS. 1 and 2, the cueing and pacing apparatus of the invention comprises a prompter unit 12 including a chassis, or bed, 14, a printed circuit board 16 housed within the chassis and a cover plate 18. Within openings provided in cover plate 18 is a first display means in the form of a four digit numerical display 20 for visually indicating running time in minutes and seconds and a second display means in the form of a linear display 22. Linear display 22 comprises a multiplicity of linearly aligned, spaced apart signal means for sequential activation of intervals of one second for indicating the passage of time in seconds. In the present embodiment of the invention the signal means is provided in the form of a row of sixty cueing and pacing lights 24 mounted along the left hand margin of the printed circuit board 16, visible through the openings in the cover plate 18.

Both the digital and linear displays are operably associated with electronic time-code means for recording a time-code on, and reading from, audio and video tapes. This time-code means comprises a part of the printed circuit board 16 and, in the present embodiment of the invention, is provided in the form of an electronic time-code generator/transmitter and a receiver/decoder of the character illustrated in FIG. 3. The time-code means is selectively operable in a first mode to generate and record a time-code on a magnetic tape and a second mode to read, that is receive and decode, the recorded time code.

Figure 3:
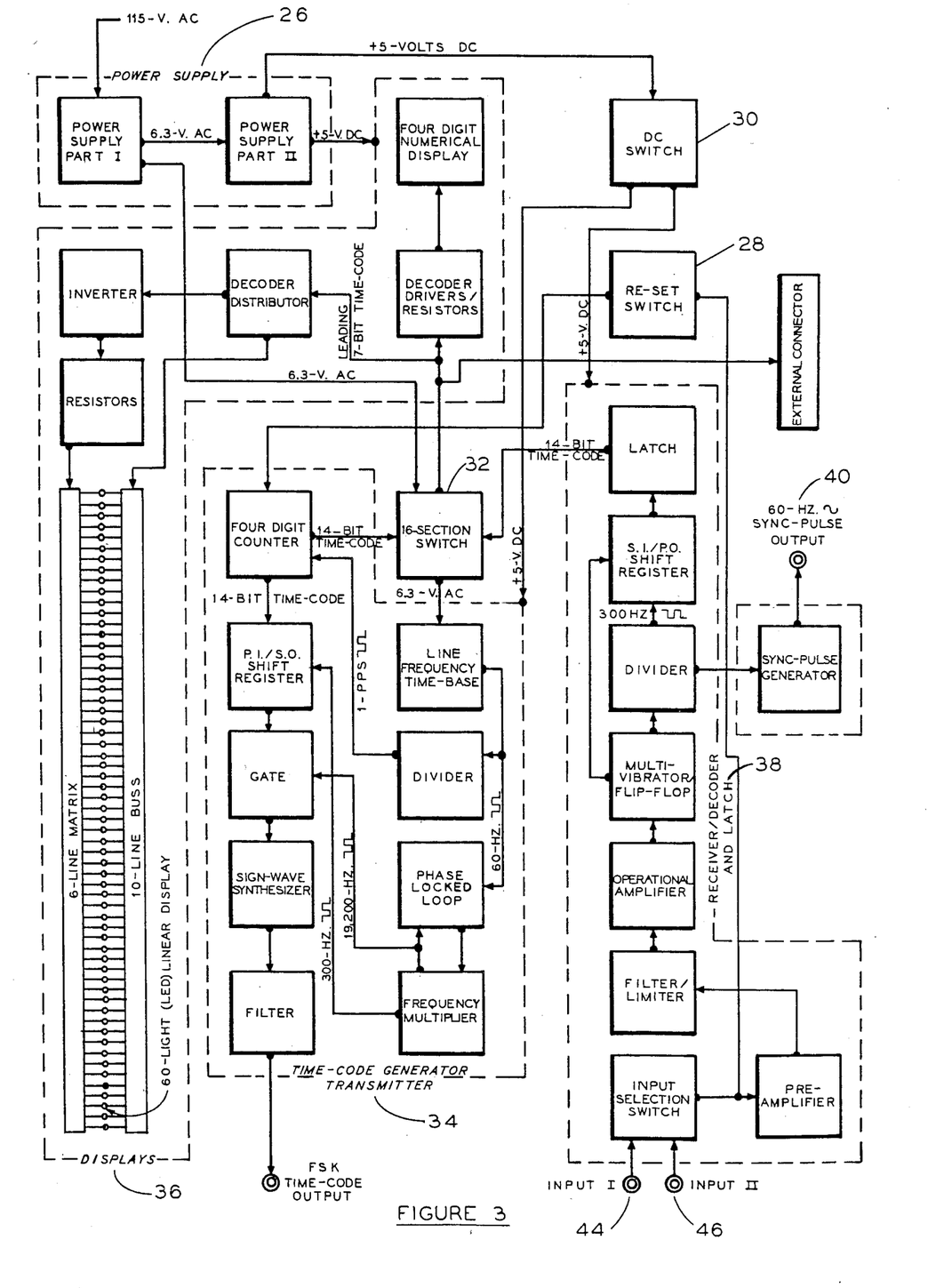
FIG. 3 is a diagramatic view illustrating the interrelationship of the various elements which comprise the electronic circuitry of the prompter unit.

Referring particularly to FIG. 3, the electronic components and functions of the prompter unit can be divided into seven principal functions identified in FIG. 3 by dotted lines enclosing the function. These functions are a power supply 26; re-set, power and time-code switches 28, 30 and 32 respectively; a time-code generator/transmitter 34; numerical and linear displays 36, a receiver/decoder and latch 38, and a synch-pulse generator 40. The details of the construction and operation of the electronic circuit of the apparatus of the invention and its functions will be described in later paragraphs following a discussion of the overall construction of the apparatus and its method of operation.

Forming an important aspect of the present invention is one of the specially designed data display form 42 which, as shown in FIG. 1, is mounted on the upper surface of the prompter unit 12. As best seen by referring to FIG. 4, form 42 is ruled so that when aligned on the unit by alignment means the lines on the sheet coincide with the lights on the prompter; both of which coincide with standard typewriter spacing, six lines to the inch. As will become apparent from the discussion which follows, since the apparatus of the invention operates at a constant clocked speed, each line represents one second, and each sheet, or form, 42 one minute. A measured script which is typed double-spaced can thus normally be fitted between lines 0 and 60, so that each typed line represents two seconds, while the pre-set line length establishes the desired narration rate.

Having now described the basic component parts of the apparatus of the invention, its use, which comprises the method of the invention, can perhaps best be illustrated by way of example. As previously mentioned, time is the controlling factor in all audio and audio-visual synchronization and with all audio-visuals the total time or length of a presentation is determined by the cumulative time or length of the individual scenes. With film or videotape the individual scene lengths are in turn determined by whether the script dictates the scene changes, or whether predetermined scene lengths establish the narration timing and placement. In practice, most films and videotapes end up a combination of these two criteria. In some instances something very specific needs to be said verbally, and the corresponding scene must be at least long enough for the narrator to articulate the statement. In other instances, the action portrayed determines the length of the scene, and the script must be written to conform.

With films and videotapes being translated to other languages, the predetermined scene lengths establish the narration timing throughout. Likewise, with many institutional and documentary presentations the film or videotape is shot to a visual storyboard, outline, or chronology, with the cameraman and the editor telling the story visually. The final script is then written to compliment rather than govern the visuals.

Considering first the situation where the narration must follow the film or videotape, it is apparent that the narrator cannot view the projected film on a screen and follow the script at the same time. Accordingly, in prior art practice, an assistant was required to cue the narrator by tapping him on the shoulder as each scene changes. This practice was both costly and inefficient. The prior art process usually involved five or more people: the narrator, the narrator's assistant, the director or a member of the production team, the sound engineer and a projectionist. Not being able to anticipate when scenes would change frequently caused the narrator to lag behind and then charge into action when cued. Unfortunately, this generally occurred at a time when the narrator's primary attention should have been placed on inflection and the meaning of the message. So the prior art procedure frequently turned into a frustrating trial and error proposition as the film or video tape was run back and forth each time the narrator flubbed.

In the practice of the method of the present invention, this costly and inefficient trial and error prior art procedure is avoided. In a manner now to be described, the apparatus of the invention uniquely provides the narrator with an electronically cued script and a bird's eye view of the proceeding and succeeding scene changes.

By way of example, consider a pre-edited videotape to which an original sound track is to be added. As a first step it is necessary to determine the length of the entire presentation and also the length of each successive scene so that a complimentary script can be written. This being the case, using the apparatus of the invention, a time-code is first recorded on the videotape's second sound track (most ¾ inch VCR or video cassette machines provide for two independent sound tracks). To record a time-code the apparatus is set to the first, or transmit, mode, and the time-code output on the prompter unit is connected to one of the video tape machine's sound inputs, or one of the line or auxiliary inputs of a dual or multitrack tape recorder (See FIG. 1). The time-code is typically recorded on the selected track at 50% or −6 db, per the recorder's VU meter. To retrieve or play back a recorded time-code the apparatus is set to the second, or receive, mode, and the respective line output on the video tape machine or tape recorder is connected to one of the unit's two input(s) (See FIG. 3, items 44 and 46 respectively).

Since, as shown in FIG. 3, the apparatus contains both a time-code generator/transmitter and a receiver/decoder, no additional equipment is required to read the time-code on playback. Further, the apparatus will directly correlate the time-code with a presentation's audio and visual elements.

Next, having recorded a time-code, a set of data display forms 42 are placed on the unit 12 in the manner illustrated in FIG. 1. With the forms in place and suitably aligned with the linear display, the apparatus is placed in the receive mode and the videotape is run. At the beginning of each successive scene as viewed on the videotape monitor the operator stops the tape. Due to the unique design of the control means of the invention which is embodied in the circuitry design, this causes the linear display to stop sequencing with a single display light 24 being lit. A caption or brief scene description is then annotated in the visuals column of the data display form (see FIG. 4) on the line opposite the activated display light. This light will remain lit as long as the videotape is stopped.

As an alternate method of determining scene length, the operator can use a spring loaded on/momentary off toggle switch provided on the prompter unit, and forming a part of the control means, (see FIG. 3,) to stop the real time reading of the time-code while monitoring the videotape during playback. Using this method, at the start of the first and each successive scene, the switch toggle is pushed forward. A caption or brief scene description is then annotated in the visuals column, on the line opposite the activated display light 24. This light will remain lit as long as the switch is held in this off position. When the switch is released, the time-code displays will again pick up the time-code at whatever position the running videotape is in.

After the entire video tape has been run and the notations made on the display forms in the manner described, the forms will precisely identify the time and position of each scene within the videotape. A measured script can then be written in the manner presently to be described and a composite sound track produced for subsequent transfer to one of the videotape's sound tracks.

As previously mentioned, the lines on the data display sheets, or forms, 42 coincide with the linear display lights 24 and also with standard typewriter spacing. Therefore, the narration can be typed directly onto the forms. Bearing in mind that each double spaced line on the form 42 represents two seconds and thirty such double spaced lines equals one minute, it is possible to type a measured script directly on the form so as to "fit" within the predetermined scene lengths. Further, by setting the typewriter margins for a given line length in character spaces, a measured script can be typed for delivery at different narration rates. For example, a 30 character line provides for a narration rate of 135 to 145 words per minute while a 36 character line provides for a narration rate of 160 to 170 words per minute. By way of illustration:

---
Line length,
in character spaces,
sets narration rate.

---
Almost two million people come to
the Music Center each year; a
vibrant cross-section of Los
Angeles' diverse community.

---

The above statement, typed within a 33-character line, 4½ lines long, when read at a rate of 150 words-per-minute, should take approximately 8 seconds to narrate. Accordingly, if a given scene length as previously marked on the data display form is slightly longer than 8 seconds to provide suitable pauses, the above narration could be read at the rate of 150 words per minute during the time the given scene was in view.

Once the script is typed on the data display forms, it is a simple matter to record the narration and transfer it to one of the video tape sound tracks or to narrate the performance of the videotape live.

Because the apparatus of the invention operates silently, without generating acoustic or electro-magnetic noise, it is ideal for cueing and pacing narration either in recording a sound track or in a presentation to a live audience. Since the data display forms not only set forth the script, but also reveal scene lengths, the narrator can anticipate scene changes and impart a natural tempo to the delivery. This can be done without having to simultaneously view the projected presentation in process or be distracted by external cueing, such as being tapped on the shoulder by an assistant viewing the presentation, a practice often used in the past in cueing film narration.

In accomplishing the actual narration, the forms 42 are stacked and positioned on the prompter. As the performance proceeds, the narrator will be precisely cued and paced by the linear display lights 24 which are disposed immediately adjacent the forms. As each minute of narration is concluded, the narrator can simply remove the top sheet and continue. Just as the apparatus can be used for cueing live narration before an audience, such as a film or programmed presentation from a podium adjacent to a viewing screen, it can also be used for cueing and pacing live commentary for a film or videotape broadcast over television.

Figure 5:
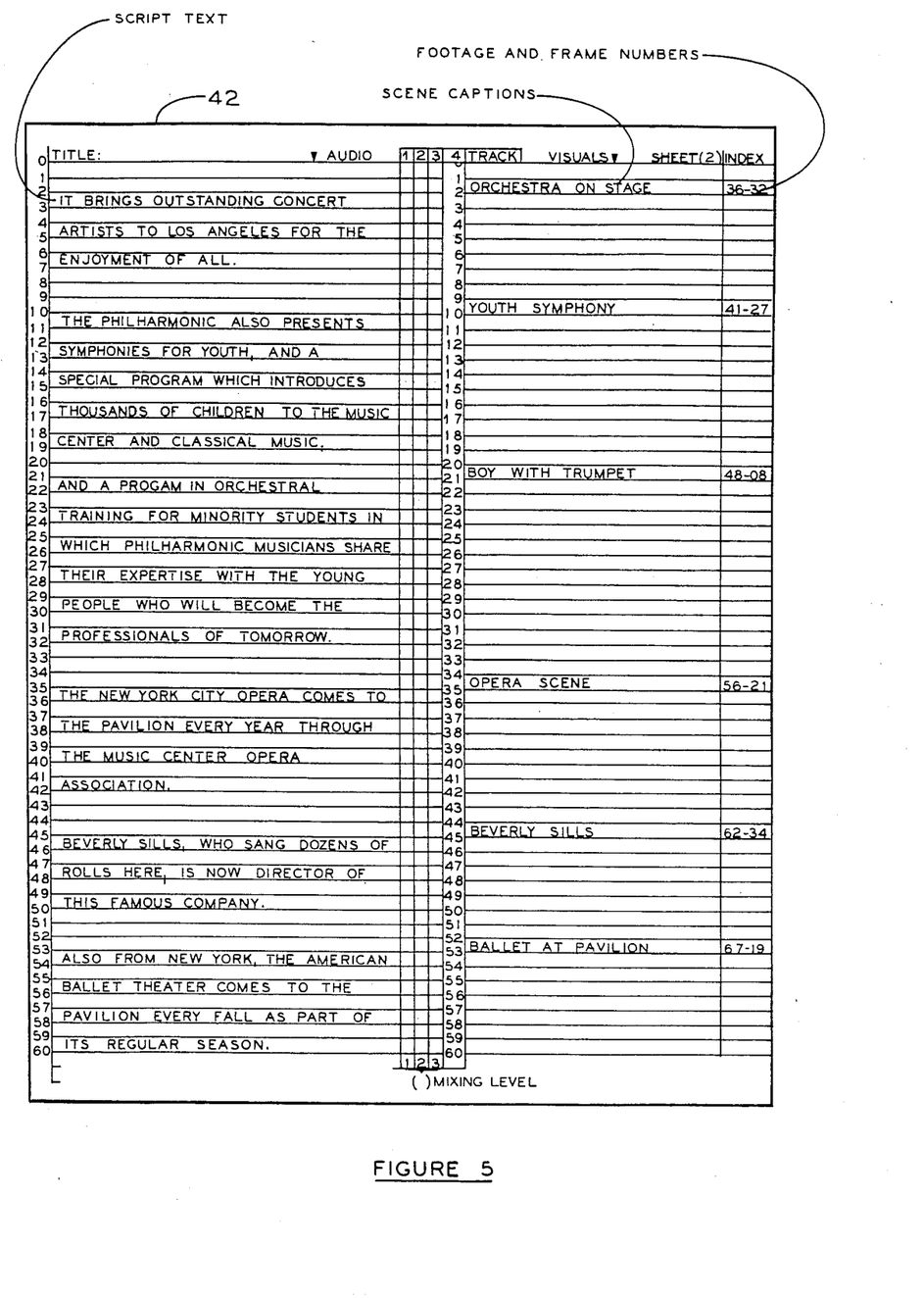
FIG. 5 is a diagramatic view of a data display form as it would appear when completed for use in a narration application.

An example of a data display form completed in accordance with the method of the present invention as described herein is illustrated in FIG. 5 of the drawings.

The method and apparatus of the invention also finds important application in timing a pre-edited 16 millimeter film. As was the case with video tape presentations, to write a narrative script to compliment scenes of predetermined length, each such scene must be measured and timed. In the case of a pre-edited 16 millimeter film, the procedure involves the use of a footage and frame counter, such as found on a film synchronizer, and a set of data display forms 42, together with a time to footage and frame conversion table. Such a conversion table is shown in abbreviated form in FIG. 4. The table itself can readily be constructed by those skilled in the art and its design and configuration forms no separate part of the present invention.

In using the data display forms and after locking the synchronizer (see FIG. 3), the counter and synchronizer sprocket wheels are set to zero. The workprint is then loaded and secured onto one of the sprocket wheels with the edit/X/sync mark in the leader opposite the zero indicator. The lock on the synchronizer is then released and the film rolled. If the leader has been correctly set up in accordance with standard editing practice, then the first frame of the first title or scene should start exactly 7 feet/28 frames from the edit/X/sync mark.

Figure 4:
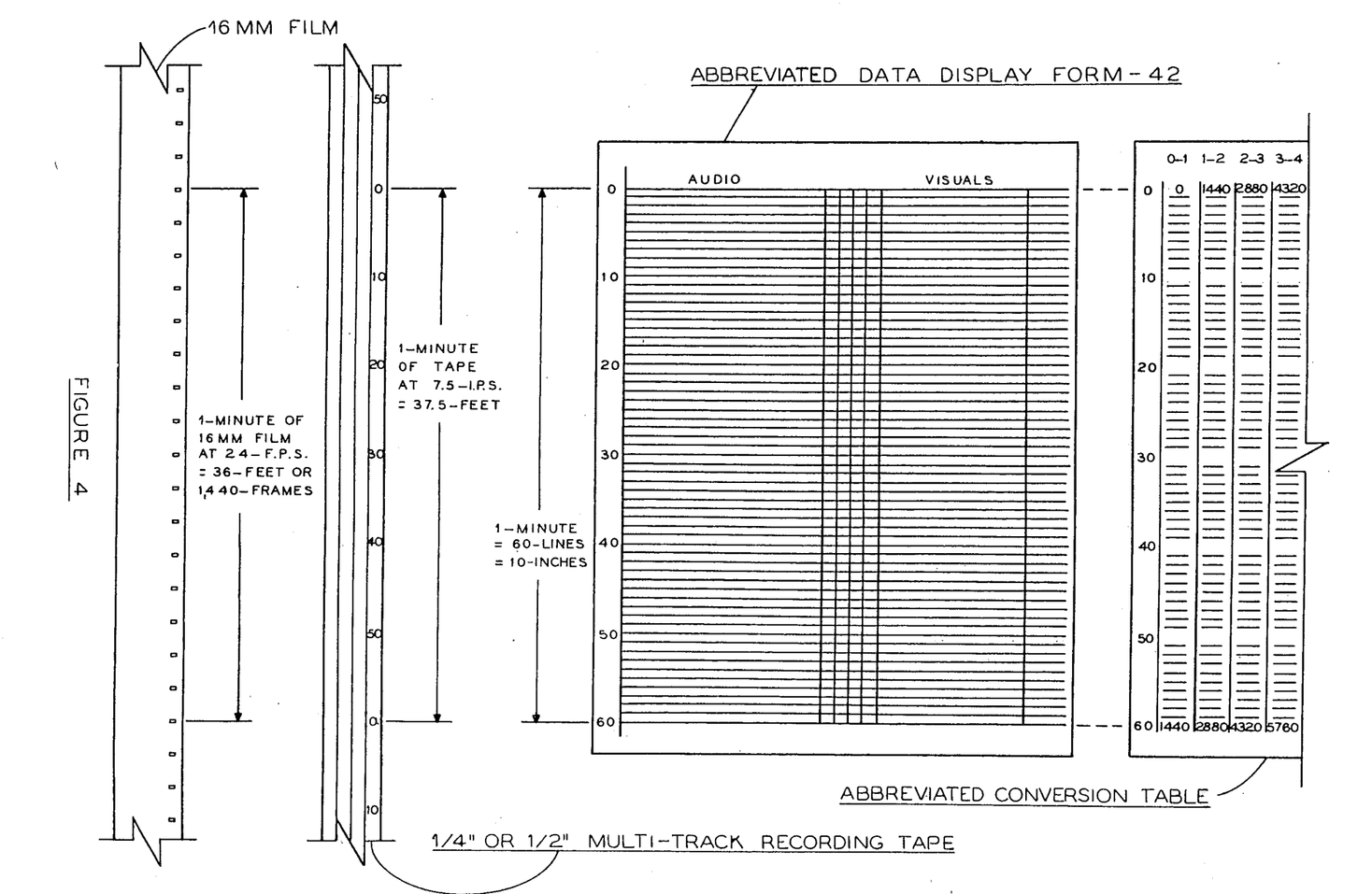
FIG. 4 is a diagramatic view illustrating the design of one of the data display forms of the invention and showing its interrelationship with film and film-strips and a conversion table for relating film footage and frames to time in minutes and seconds.

According to a conversion table of the character previously described and as illustrated in FIG. 4, 7 feet/28 frames is equivalent to between 12 and 13 seconds of running time, at 24 frames per second. So the descriptive caption for the first title or scene in the film is entered in the visuals column of the form between the 12th and 13th lines and the number 7-28 is entered in the right hand margin of the form.

The first frame of each succeeding scene is thus checked, converted to minutes and second, and annotated accordingly on the data display forms, using a separate sheet for each minute of film. It is to be appreciated that in effect, the content of each 36 feet of film is proportionately reduced, and graphically represented within the space delineated by the form 42.

Another meaningful example of the novel and varied use of the apparatus of the present invention relates to the situation where the script itself dictates the scene changes, such as in film strip or slide presentations. In such instances, the script is normally written without precise time constraints and is recorded "wild" on a multitrack tape. To set the script text to time on the data display forms, the starting time and length of each successive phrase or statement must be determined. This can be accomplished in the following ways:

With the data display forms in place on unit 12 and with the apparatus in the receive mode, the multitrack tape having the narration recorded thereon is played back. During playback the first word of each successive phrase or statement is noted in the left margin of the audio column of the data display forms. The notation is made on the line opposite the linear display light 24 which is activated at the time the word is heard. The notation can be a check mark, or the actual word penciled in.

Alternately, with the apparatus in the receive mode, the operator can use the spring loaded on/momentary off toggle switch on the device to stop the real time reading of the time-code during playback. The instant the first word of each successive phrase or statement is heard, the switch toggle is pushed forward. The corresponding light in the linear display will then remain lit as long as the switch is held in this off position. The applicable word is then noted in the left margin of the audio column of the forms as above. When the switch is released, the displays of the apparatus will again pick up the time-code at whatever position the running tape is in.

A third method of determining the starting time and length of each phrase on the multitrack audio tapes to is to stop the tape during playback at the beginning of each successive phrase or statement. The applicable word is then annotated in the left margin of the audio column of the data display forms, on the line opposite the activated linear display light 24. This light will remain lit as long as the recorder is stopped.

Having established the starting time for each successive phrase or statement in one of the ways outlined in the preceding paragraphs, the setting of the script text to time can next be undertaken. In accomplishing this step, it must be recognized that the length of the lines will vary with the rate of the recorded narration, and can change from statement to statement. However, the proper line length can be readily established by determining the appropriate character and space count in each phrase or statement, and dividing that number by the actual time required to narrate them.

The following statement taken from the script of a multi-image presentation will serve to illustrate the procedure for determining the appropriate character and space count.

| | |
|---|---|
| Under Maestro Carlo Maria Giulini | 33 |
| and Executive Director Ernest Fleischman, | 41 |
| the Los Angeles Philharmonic | 28 |
| has become one of a handful | 27 |
| of world-class orchestras. | 26 |
| | 155 |

Using a character measuring rule, one simply measures the character spaces in each line for a total of 155. This number is then divided by the 10.5 seconds it took to narrate the statement, as measured by the apparatus of the invention or a stop watch.

As 155/10.5=14.7, one can now set the above statement to time and space, within 10½ single-spaced lines, 15 character spaces long as follows:

```
 1 ⁻under maestro c
   ⁻arlo maria guil
   ⁻ini and executi
   ⁻ve director ern
   ⁻est fleischman,
   ⁻the los angeles
   ⁻philharmonic ha
   ⁻s become one of
   ⁻a handful of wo
10 ⁻rld-class orche
   ⁼stras.
```

Once the narration is properly set forth on the data display forms and plotted against visual changes, the apparatus can be used for both real time and leisure time programming of signals recorded adjacent to a composite sound track to automatically trigger film strip advances or slide changes.

In real time programming, tone signals to be recorded are pulsed by the programmer as he or she listens to the narrated track for cues. However, where slide changes or film strip frames are to be sequenced during musical passages, where there is no narration to guide the programmer, the process becomes either an elaborate timing operation or a guessing game. In these situations, the apparatus of the invention along with the data display forms provide the precise cues needed, and eliminate the problem.

In leisure time programming, where either punched tape or digital programming equipment is employed, change signals are encoded one at a time, in accordance with pre-established time internals. Here the data display forms can set forth the preestablished times, and simplify the programming operation. Then, once the presentation has been programmed, it can be checked against the timed program on the forms and the pacing of the apparatus for accuracy.

Figure 6:
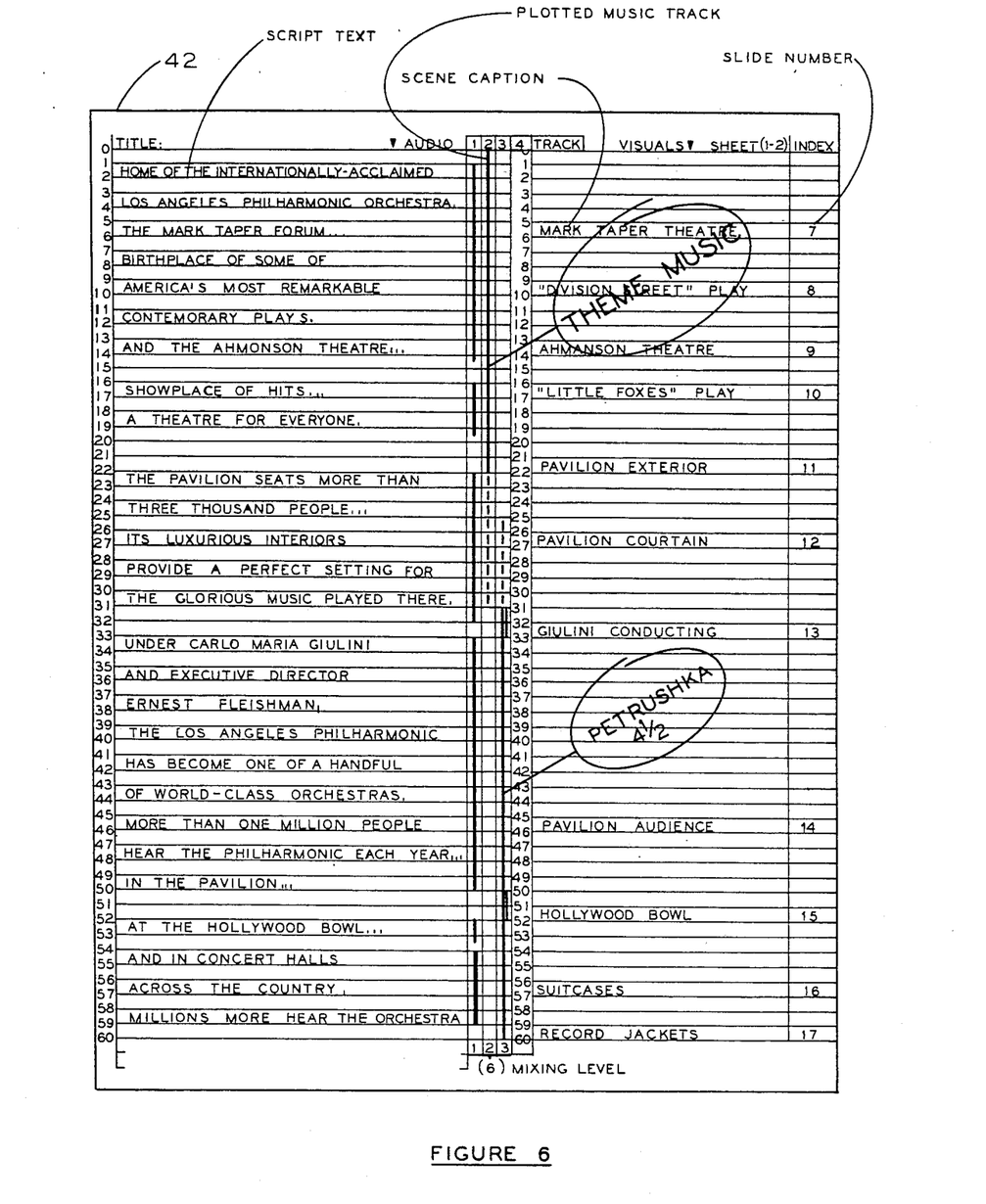
FIG. 6 is a diagramatic view of a data display form similar to that shown in FIG. 5 but shown completed for use in a slide presentation.

A completed data display form as might be used for a slide presentation is illustrated in FIG. 6 of the drawings and serves to illustrate the methods described in the preceding paragraphs.

Referring to FIGS. 4 and 6, it is to be noted that the standard data display form 42 provides three vertical columns for plotting the position of the planned or actual narration, plus the selected music and sound effect tracks, all in precise relation to the time-code and the picture captions. The first column and its corresponding number one track on the multitrack tape, is normally used for narration. The second and third columns, and their corresponding tracks on the multitrack tape, are used for music and sound effects as appropriate. The fourth column, with its preprinted numbers, corresponds with the number four track on the multi-track tape, which is used for the time-code.

Dotted lines are used to indicate that music or sound effects are recorded or dubbed onto the respective tracks of the multitrack tape as plotted, but that those portions are held closed or inaudible during mix-down. They are simply recorded there to facilitate timing, and provide the necessary lead-ins and lead-outs for fades and segues.

Solid lines are used to indicate that the track is open or audible during mix-down. The narration is normally indicated by a single, solid line, with breaks to indicate the precise location of pauses between narrative segments. The exact length and placement of the lines should, of course, coincide with the planned or actual narration. A single line in the music and sound effects columns indicates that the respective sounds are held at a background level, while a double line indicates that the level is brought up during the indicated pauses in narration. Ballooned notations then identify the content of the tracks, and indicate the relative volume levels. Overlapping lines in adjacent music and sound effect columns indicate a segue or cross fade.

A solid line which is *not preceded* by a dotted line indicates that the respective music or sound effect recorded there has a natural in, and does not require a fade in during mix-down. Likewise, a solid line which is not succeeded by a dotted line indicates that the respective music or sound effect recorded there has a natural out, and does not require a fade out during mix-down.

Still another unique application of the apparatus of the invention is in sound-track and video editing. Whether the narration is recorded wild, or cued and paced by the apparatus, the narration tape will normally require some editing either to remove extraneous noises, substitute flubbed or flawed sections, or alter pause times. This editing can be done mechanically by cutting and splicing, or it can be accomplished electronically.

In electronic editing the selected takes are dubbed to another tape in their proper order, with appropriate pauses between them. They can either be dubbed to an intermediate tape, or directly to the master multi-track tape from which the final mix-down will be made.

On transfer, the individual narrative statements can be left to start or fall where they may, or they can be keyed exactly to pre-established code positions. The choice depends on whether the script is to dictate scene changes, as with a filmstrip or slide presentation, or, whether pre-determined scene lengths establish the narration timing and placement, as with pre-edited film or videotape visuals. Either way, a time-code track on the original voice track recording, and a time-code track on the tape to which it is being transferred will greatly facilitate the operation. The apparatus of the invention and the data display forms further simplify the task.

Then, too, just as the apparatus time-code facilitates electronic transfer and editing of sound, it is equally useful for video editing.

Yet another extremely valuable application of the apparatus and methods of the present invention is in music and sound effects profiling. To simplify timing and cueing of music and sound effects derived from records, the selected music and sound effects should be transferred to an intermediate tape, recording the music and sound effects on one track, and a time-code on a second track in the manner previously described.

The time-code should be set to start at zero, opposite the start of each muscial selection and sound effect recorded. This can be accomplished through the time-code re-set switch, which is operative when the apparatus of the invention is in the transmit mode. Then, using the data display forms and the apparatus in the receive mode, the tape is played back and stopped at each point of interest, as for example, an accent, a particular note, a change in rhythm, the introduction of a new instrument, or the like. Appropriate notations are then made on the data display forms opposite the activated light on the device which light 24 will remain lit as long as the tape is stopped. This light together with the numerical display 20 will indicate the time in minutes and seconds from the zero-start. The recording can thus be profiled, indicating key points as well as intermediate and total times. In this way, it can easily be determined whether a muscial passage or sound effect, or portion thereof, is long enough to bridge a particular time span, or whether it is longer than needed, requiring a fade-out or segue to another track during mix-down. The process eliminates the stopwatch gymnastics and mental gyrations that typically accompany these tasks in the practice of prior art methods.

The music and sound effects, or selected portions thereof, are then transferred to open tracks of the master multitrack tape, alongside the narration and time-code tracks, as plotted on the data display forms.

Turning once again to FIG. 3 of the drawings, the device of the present form of the invention utilizes digital electronic technology and employs both TTL (transistor-transistor-logic) and CMOS (complimentary-metal-oxide-semiconductor) integrated circuits. Together with a limited number of discrete components, they are, with few exceptions, all mounted on one side of a double-sided printed circuit board in the manner illustrated in FIG. 3.

The power supply 26 is a full-wave bridge rectifier type. Its unique features lie in the choice of component parameters, and the way in which the power supply is broken into two parts as indicated in FIG. 3. The power cord 50 and integral plug 52, power switch 54, pilot light 56, as well as other standard components such as fuses, transformers and a polarized female connector are contained in a separate or independent chassis designated in FIG. 1 by the numeral 26a. A polarized male connector, eight foot cable 58, rectifier assembly, filtering capacitors and voltage regulators are part of the apparatus housed within chassis 14.

Placing the transformers on a separate chassis eliminates the noise that would otherwise be picked up by a recording microphone placed in the proximity of the apparatus of the invention. Noise due to the magnetic flux radiation and the physical resonance of the laminated transformer cores is substantially minimized by this expedient.

The transformers contained in the separate power supply chassis 26a operate off a 115 volt AC line input. One of the transformers provides a 6.3 volt AC output at 3 amperes. This powers the bridge rectifier and voltage regulators in the main unit of the apparatus through the 8 foot interconnecting cable 58. The other transformer provides a low power 6.3 volt, center tapped, AC output. This is also routed through the 8 foot interconnecting cable to regulate the line-frequency-timebase circuit forming a part of the printed circuit board 16.

Within the printed circuit of the apparatus, the bridge rectifier and voltage regulators provide two +5 volt DC outputs at 1½ amperes each. One of these is connected permanently to power the displays. The other is fed through a double pole/double throw switch, from where it can be routed to power either the time-code generator/transmitter circuits, or to the receiver/decoder circuits. It thus reduces both circuit interference and overall power requirements.

The line-frequency-time-base/divider circuit, as identified in FIG. 3, converts the 6.3 volt, 60 cycle AC supply to a 60 Hertz square wave, and a 1 pulse-per-second digital output.

The 1 pulse per second signal drives the main counter circuit. It counts minutes and seconds, and can be reset by a reset switch. The counter produces a 14 bit cascaded BCD (binary coded decimal) time-code. The line frequency time base/divider circuit and the main counter circuit form the time-code generator.

The 14 bit code is fed through a 16 section push button switch (16 single pole/double throw switches which operate in unison), switched to the transmit mode, to the four decoder/drivers in the numerical display 20. They decode the 14 bit code and drive the four 7 segment displays.

The 7 leading bits of the code are also routed to the decoder/distributors, which decode the seconds portion of the code, and drive the 60 light linear display 22.

At the same time as the displays follow the running time-code, the code is fed from the main counter to a parallel in/serial out shift register.

The shift register is clocked by a 300 Hertz digital signal from the phase locked loop/multiplier circuit, which also produces a 19,200 Hertz digital output. These frequencies are controlled by the 60 Hertz digital signal from the line frequency time base to the phase locked loop.

The 19,200 Hertz signal is routed to a sign wave synthesizer, through a gating circuit. The gating circuit either passes along the 19,200 Hertz signal or half that frequency (9,600 Hertz) depending on whether the gate is receiving a digital "1" or a digital "0" from the shift register output port.

The sign wave synthesizer in turn produces a 2,400 Hertz or a 1,200 Hertz FSK (frequency shift keyed) staircase output.

A filter then smoothes out the staircase signal to a FSK sign-wave output which is compatible with audio recording inputs of a tape or video recorder.

Retrieving and decoding the time-code on a audio or video tape, starts by routing the corresponding recorder output to one of the device's signal inputs.

As indicated in FIG. 3, the circuitry of the apparatus includes: Two signal inputs and an input selection switch to permit reading the time-code from either of two recorders; a function needed in the course of electronic editing; the input signal is then routed through a preamplifier to a filter and limiter circuit, followed by an operational amplifier (they convert the phase shifted sign-waves back to digital, or square wave signals); a retriggerable multivibrator and flip-flop circuit then read a 2,400 Hertz signal as a digital "1" and a 1,200 Hertz signal as a digital "0"; the digital "1"s and "0"s are then passed along in order to a serial in/parallel out shift register; the shift register which is clocked by a nominal 300 Hertz digital signal from a three stage divider circuit, thus reconstructs the 14 bit BCD time-code; the time-code is then held in a latching circuit for use in running the numerical and linear displays, through the 16 section switch, switched to the receive mode; concurrently, the three stage divider circuit which is driven by the multivibrator/flip-flop, also produces a nominal 600 Hertz digital signal which is routed to a sign-wave synthesizer. This five stage generator produces a 60 Hertz staircase signal which is rounded out to a sign-wave by means of a filtering capacitor.

Because the nominal 60 Hertz synthesized sign-wave is derived from the time-code on the tape, it reflects any tape speed variations. It can thus be used as a sync-tone signal for synchronizing or interlocking a composite sound track tape with sprocketed magnetic or optical film tracks.

Illustrated in FIG. 3 is an external connector, intended as an optional feature. This multi-pin connector will provide an output for the 14 bit BCD time-code. It can be used in conjunction with a comparator/switching unit, for automatic or programmable recording and mixing.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for use in cueing and pacing audio and visual presentations comprising:
    (a) electronic time code means selectively operable in a first and second mode, said means being adapted to be operated in a first mode to record a time code on a magnetic recording tape and adapted to be operated in a second mode for reading said time code from said magnetic recording tape;

(b) a first and second time display means operable by said time code means when said means is in said second mode for displaying elapsed time, said second display means comprising a row of sixty linearly aligned lights adapted to be consecutively energized at one second intervals;

(c) data display means for manually recording and displaying data, including a writing surface having a multiplicity of spaced apart lines inscribed thereon;

(d) alignment means for aligning said spaced apart lines inscribed on said writing surface with said lights of said second display means; and (e) control means for selectively starting and stopping said time code means.

2. A method for enabling the cueing and pacing of the narration of a visual performance which has been recorded in retrievable form for later imaging, said method making use of an apparatus which is operably associated with an imaging means used to image the visual performance; said apparatus including time-code means for selectively recording and retrieving a time-code signal; visual time elapse means operated by the time-code means and comprising a multiplicity of signal means for sequentially signaling the passage of a predetermined interval of time; control means for simultaneously stopping the time elapse means and the imaging means; and data display means comprising a plurality of forms each including a writing surface having a multiplicity of lines thereon adapted to be correlated with said signal means said method comprising the steps of:

(a) recording a time-code on a recording tape;

(b) imaging the visual performance while simultaneously retrieving the recorded time-code thereby causing the signal means to sequentially activate;

(c) sequentially stopping the imaging and the time-code at the beginning of each scene of the visual performance;

(d) sequentially noting on the line of said data display form adjacent the activated signal means the beginning of each scene; and (e) transcribing on said writing surfaces of said data display forms between said notations a narrative segment describing each said scene, the duration of each said segment being less than the duration of said scene corresponding thereto.

3. A method for cueing and pacing of the narration of a visual performance which has been recorded, or placed on film, said method making use of an apparatus which is operably associated with an imaging means such as a video recorder or film projector used to image the visual performance; said apparatus including time-code means for selectively recording and retrieving a time-code signal; visual time elapse means operated by the time-code means and comprising a row of sixty spaced apart light adapted to sequentially illuminate at one second intervals; control means for simultaneously stopping the time elapse means and the imaging means; and data display means comprising a plurality of forms each including a writing surface having sixty lines thereon adapted to be aligned with said lights of said time code means, said method comprising the steps of:

(a) recording a time-code on a recording tape;

(b) imaging the visual performance while simultaneously retrieving the recorded time-code thereby causing the lights to illuminate sequentially;

(c) sequentially stopping the imaging and the time-code at the beginning of each scene of the visual performance;

(d) sequentially noting on the line of said data display form adjacent the illuminated light the beginning of each scene;

(e) transcribing on said writing surfaces of said data display forms between said notations a narrative segment describing each said scene, the duration of each said segment being less than the duration of said scene corresponding thereto; and (f) reimaging the visual performance while simultaneously reading said transcribed notations for each said scene, said reading for each said scene commencing when said light opposite the beginning of each said scene becomes illuminated.

* * * * *